United States Patent
Ebert et al.

(10) Patent No.: US 7,021,121 B2
(45) Date of Patent: Apr. 4, 2006

(54) GAS GAUGE PROXIMITY SENSOR WITH A MODULATED GAS FLOW

(75) Inventors: Earl W. Ebert, Oxford, CT (US); Daniel N. Galburt, Wilton, CT (US); Joseph H. Lyons, Wilton, CT (US)

(73) Assignee: ASML Holding N.V., Veldhoven (NL)

( * ) Notice: Subject to any disclaimer, the term of this patent is extended or adjusted under 35 U.S.C. 154(b) by 103 days.

(21) Appl. No.: 10/854,429

(22) Filed: May 27, 2004

(65) Prior Publication Data

US 2005/0274173 A1    Dec. 15, 2005

(51) Int. Cl.
*G01B 13/08* (2006.01)
(52) U.S. Cl. ......................................... 73/37.5; 73/861
(58) Field of Classification Search ............... 73/23.2, 73/861, 37.5

See application file for complete search history.

(56) References Cited

U.S. PATENT DOCUMENTS

| | | | |
|---|---|---|---|
| 4,550,592 A | 11/1985 | Dechape | |
| 4,953,388 A | 9/1990 | Barada | |
| 5,152,174 A * | 10/1992 | LaBudde | 73/861.02 |
| 6,311,136 B1 * | 10/2001 | Henry et al. | 702/45 |
| 6,505,519 B1 * | 1/2003 | Henry et al. | 73/861.356 |

(Continued)

FOREIGN PATENT DOCUMENTS

EP         1431709 A2 *   6/2004

OTHER PUBLICATIONS

Gajdeczko et al., U.S. Appl. No. 10/812,098, filed Mar. 30, 2004, entitled "Pressure Sensor," 24 pages.

(Continued)

*Primary Examiner*—Hezron Williams
*Assistant Examiner*—Rodney Frank
(74) *Attorney, Agent, or Firm*—Sterne, Kessler, Goldstein & Fox P.L.L.C.

(57) ABSTRACT

A gas gauge proximity sensor modulates a gas stream that is used to feed reference and measurement air gauges, respectively, in a reference portion proximate a reference surface and a measurement portion proximate a measurement surface. The gas stream can be modulated at a frequency at which there is minimal acoustical interference energy (e.g., minimal noise) in demodulated output signal. The sensor output can be filtered so that a measurement signal includes only the modulated frequency and side bands of that frequency to include the desired response band of the device as a whole. The filtered signal can be demodulated using a demodulator operating at a same frequency as the modulator to produce the demodulated output signal. In this embodiment, substantially only ambient acoustical energy in the band pass region may interfere with the device operation. Alternatively, the modulation can be introduced through the reference portion. A reference nozzle sets up a pressure field with the reference surface. A carrier frequency can be generated by mechanical motion of the reference surface. For example, this motion can be introduced by a mechanism like a piezoelectric device or a voice coil coupled to the reference surface. The modulated gas flow combines with the other gas flows to produce a modulated combined gas flow.

47 Claims, 10 Drawing Sheets

U.S. PATENT DOCUMENTS

| | | | |
|---|---|---|---|
| 6,507,791 B1 * | 1/2003 | Henry et al. | 702/45 |
| 6,754,594 B1 * | 6/2004 | Henry et al. | 702/45 |
| 6,758,102 B1 * | 7/2004 | Henry et al. | 73/861.356 |
| 6,917,887 B1 * | 7/2005 | Henry et al. | 702/45 |
| 2001/0045134 A1 * | 11/2001 | Henry et al. | 73/861.356 |
| 2004/0118183 A1 | 6/2004 | Gajdeczko et al. | |
| 2004/0118184 A1 | 6/2004 | Violette | |
| 2005/0044963 A1 | 3/2005 | Lyons | |

OTHER PUBLICATIONS

Carter et al., U.S. Appl. No. 10/833,249, filed Apr. 28, 2004, entitled "High Resolution Gas Gauge Proximity Sensor," 29 pages.

Galburt et al., U.S. Appl. No. 10/894,028, filed Jul. 20, 2004, entitled "Fluid Gauge Proximity Sensor and Method of Operating Same Using a Modulated Fluid Flow," 41 pages.

* cited by examiner

GAS GAUGE PROXIMITY SENSOR WITH A MODULATED GAS FLOW

BACKGROUND OF THE INVENTION

1. Field of the Invention

The present invention relates to an apparatus and method for detecting very small distances, and more particularly to proximity sensing with gas flow.

2. Related Art

Many automated manufacturing processes require the sensing of the distance between a manufacturing tool and the product or material surface being worked, often referred to as a "work piece" (e.g., a semiconductor wafer, a flat panel display substrate, or the like). In some situations, such as lithography (e.g., maskless lithography, immersion lithography, photolithography, etc), the distance must be measured with accuracy approaching a nanometer.

The challenges associated with creating a proximity sensor of such accuracy are significant, particularly in the context of lithography systems. In the lithography context, in addition to being non-intrusive and having the ability to precisely detect very small distances, the proximity sensor can not introduce contaminants or come in contact with the work piece, typically the semiconductor wafer, flat panel display, or the like. Occurrence of either situation may significantly degrade or ruin the work piece.

Different types of proximity sensors are available to measure very small distances. Examples of proximity sensors include capacitance sensors and optical sensors. These proximity sensors have serious shortcomings when used in the lithography systems because physical properties of materials deposited on wafers or substrates may impact the precision of these devices. For example, capacitance gauges, being dependent on the concentration of electric charges, can yield spurious proximity readings in locations where one type of material (e.g., metal) is concentrated. Another class of problems occurs when exotic wafers made of non-conductive and/or photosensitive materials, such as Gallium Arsenide (GaAs) and Indium Phosphide (InP), are used. Further problems can result from light interacting with under-the-surface parts of the wafers or substrates, which can cause spurious reflections and unwanted interference patterns. In these cases, capacitance and optical sensors are not optimal.

An alternative approach to proximity sensing uses a gas gauge sensor. A gas gauge sensor is not vulnerable to concentrations of electric charges or electrical, optical, and other physical properties of a substrate surface. Current semiconductor manufacturing requires that proximity be gauged with high precision on the order of nanometers. Gas gauge technology can be an accurate method of measuring the distance to a surface in a close proximity. Gas gauges are insensitive to the optical or electrical properties of the material being measured. Distance accuracy can be on the order of nanometers. Gas gauges can be employed in the lithography systems to establish a distance to a top surface of the wafer or substrate.

Focus precision requirements have tightened dramatically as the printed feature size shrinks. One problem with gas gauge proximity sensors is that they can be sensitive to low frequency external acoustical interference and sensor offset errors. Lithography tool exposure system stages often employ interferometers to control position, and these can be sensitive to gasses of different content, pressure and temperature.

Therefore, a gas gauge proximity sensor is desired that is substantially insensitive to external noise.

SUMMARY OF THE INVENTION

An embodiment of the present invention provides a system including a measuring and reference portion, a modulator, a detector, a filter, and a demodulator. The measuring portion detects a first gas flow proximate a measured surface. The reference portion detects a second gas flow proximate a reference surface. The modulator produces a modulated third gas flow, which is at least partially based on a gas from a gas source, flowing through the measuring portion and the reference portion. The detector generates a differential signal corresponding to a difference between the first and second gas flows. The filter filters the differential signal to produce a filtered signal. The demodulator then demodulates the filtered signal to produce a measurement value.

Another embodiment of the present invention provides a method comprising at least the following steps. Modulating a gas flow that travels through a reference channel and a measurement channel. Positioning a reference channel probe proximate a reference surface and a measurement channel probe proximate a measurement surface. Detecting a first gas flow using the reference channel probe and a second gas flow using the measurement channel probe. Comparing the first and second gas flows to generate a differential gas flow value. Filtering the differential gas flow value to generate a filtered signal. Demodulating the filtered signal, whereby measurement channel and reference channel standoffs are measured.

A further embodiment of the present invention provides a gas gauge proximity sensor including a measuring portion, a reference portion, an acoustical driver, a detector, a filter, and a demodulator. The measuring portion detects a first gas flow proximate a measured surface. The reference portion detects a second gas flow proximate a reference surface. The acoustical driver generates a third, bi-directional gas flow through the measuring portion and the reference portion using gas adjacent at least one of a measured surface and a reference surface. The detector generates a differential signal corresponding to a difference between the first and second gas flows. The filter filters the differential signal to produce a filtered signal. The demodulator demodulates the filtered signal to produce a measured value. They measured value can correspond to a position of the measured surface.

A still further embodiment of the present invention provides a method including at least the following steps. Acoustically driving a gas flow bi-directionally through a reference channel and a measurement channel. Positioning a reference channel probe proximate to a reference surface and a measurement channel probe proximate a measurement surface. Detecting a first gas flow using the reference channel probe and a second gas flow using the measurement channel probe. Comparing the first and second gas flows to generate a differential gas flow value. Filtering the differential gas flow value to generate a filtered signal. Demodulating the filtered signal, such that measurement channel and reference channel standoffs are detected.

Further embodiments, features, and advantages of the present invention, as well as the structure and operation of the various embodiments of the present invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

Overview

Figure 1:
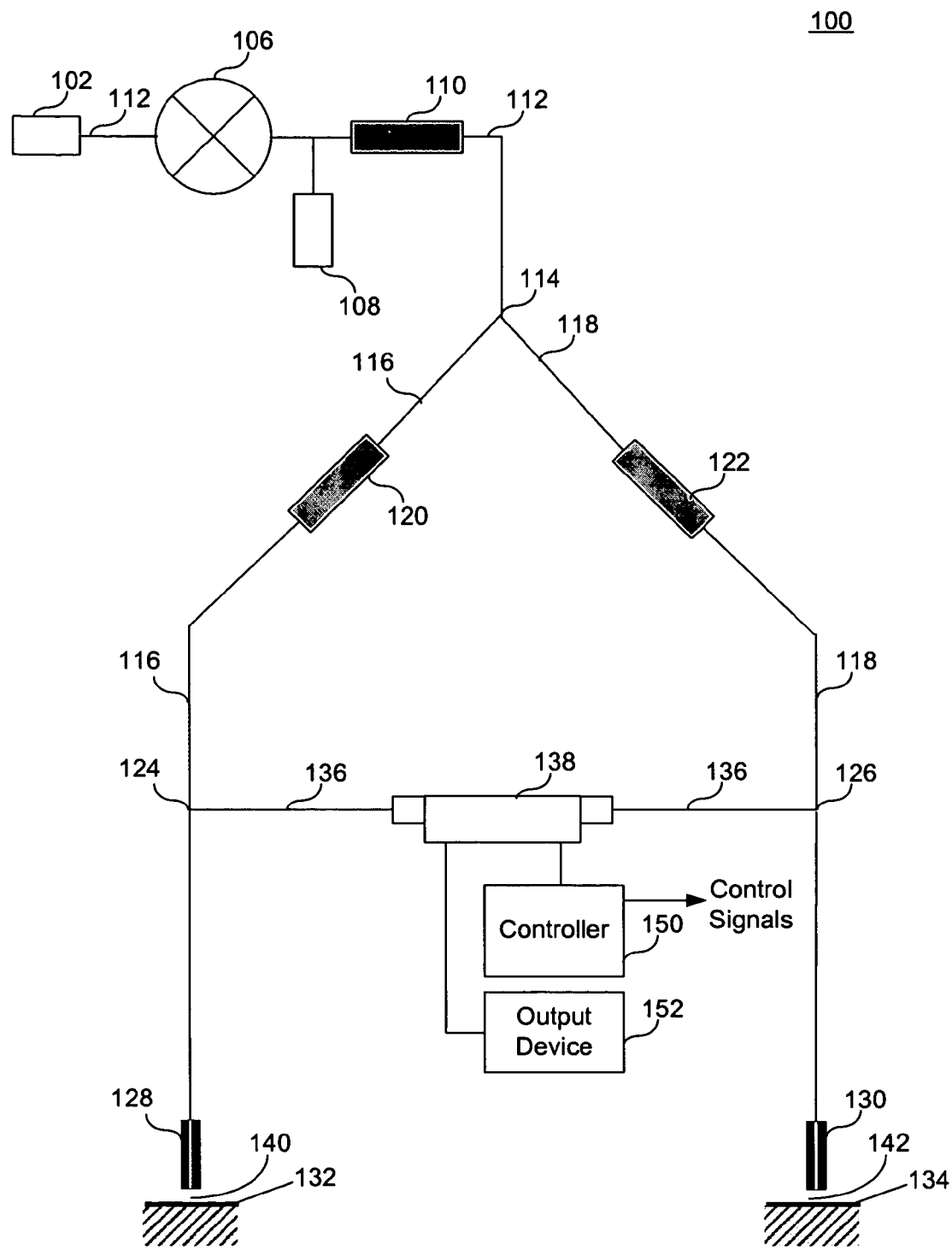
FIG. 1 is a diagram of a gas gauge proximity sensor, according to one embodiment of the present invention.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

In one embodiment of the present invention, a gas gauge proximity sensor modulates a gas stream that is used to feed reference and measurement air gauges, respectively, in a reference portion proximate a reference surface and a measurement portion proximate a measurement surface. The gas stream is modulated at a frequency at which there is minimal acoustical interference energy (e.g., minimal noise) in demodulated output signal. The sensor output is filtered so that a measurement signal includes only the modulated frequency and side bands of that frequency to include the desired response band of the device as a whole. The filtered signal is demodulated using a demodulator operating at a same frequency as the modulator to produce the demodulated output signal. In this embodiment, substantially only ambient acoustical energy in the band pass region may interfere with the device operation.

In an alternative embodiment, the modulation is introduced through the reference portion. A reference nozzle sets up a pressure field with the reference surface. A carrier frequency can be generated by mechanical motion of the reference surface. For example, this motion is introduced by a mechanism like a piezoelectric device or a voice coil coupled to the reference surface. The modulated gas flow combines with the other gas flows to produce a modulated combined gas flow.

In one example, a coil or voice coil is part of a speaker that consists of a small coil of small wire positioned very close to a permanent magnetic field. When electrical current is fed into the voice coil, the coil will either move forward or backward due to its interaction with the magnetic field. When the cone of a speaker is fastened to the voice coil, the cone will move.

In a further embodiment of the present invention provides a system and method that use a gas gauge proximity sensor including an acoustical driver modulated by a modulation frequency. The acoustical driver supplies a gas gauge bridge with an alternating (modulated) gas flow. This modulated gas flow interacts with a measurement surface and a reference surface, such that a sensor on the bridge detects either flow or pressure imbalances between air flow near the measurement surface and air flow near the reference surface, which may be a function of a measurement gap. The modulated sensor output is filtered (e.g., band pass, band limited, high pass, etc. filtered) to include the modulated frequency and sufficient bandwidth on either side of that frequency. Then, the filtered signal is demodulated using a demodulator operating at the acoustical driver modulation frequency. Using this system and method resultd in only ambient acoustical energy in a desired frequency range of the device actually having the opportunity to interfere with the device operation. This lowers the devices overall sensitivity to external acoustical noise and sensor offset.

Using this arrangement substantially eliminates the need for a conditioned air source and reduce sensor sensitivity to both low frequency external acoustical disturbances and sensor offset errors.

Gas Gauge Proximity Sensor

FIG. 1 illustrates a gas gauge proximity sensor 100, according to an embodiment of the present invention. Gas gauge proximity sensor 100 can include a dynamic flow controller 106 (e.g., a mass flow controller), a central channel 112, a measurement channel 116, a reference channel 118, a measurement channel restrictor 120, a reference channel restrictor 122, a measurement probe 128, a reference probe 130, a bridge channel 136, and a mass flow sensor 138. A gas supply 102 can inject gas at a desired pressure into gas gauge proximity sensor 100.

Central channel 112 connects gas supply 102 to mass flow controller 106 and then terminates at a junction 114 (e.g., a gas dividing or directing portion). Mass flow controller 106 can maintain a constant flow rate within gas gauge proximity sensor 100. Gas is forced out from mass flow controller 106 through a porous snubber 110, with an accumulator 108 affixed to channel 112. Snubber 110 can reduce gas turbulence introduced by the gas supply 102, and its use is optional. Upon exiting snubber 110, gas travels through central channel 112 to junction 114. Central channel 112 terminates at junction 114 and divides into measurement channel 116 and reference channel 118. In one embodiment, mass flow controller 106 can inject gas at a sufficiently low rate to provide laminar and incompressible fluid flow throughout the system to minimize the production of undesired pneumatic noise.

A bridge channel 136 is coupled between measurement channel 116 and reference channel 118. Bridge channel 136 connects to measurement channel 116 at junction 124. Bridge channel 136 connects to reference channel 118 at junction 126. In one embodiment, the distance between junction 114 and junction 124 and the distance between junction 114 and junction 126 are equal. It is to be appreciate other embodiments are envisioned with different arrangements.

All channels within gas gauge proximity sensor 100 can permit gas to flow through them. Channels 112, 116, 118, and 136 can be made up of conduits (e.g., tubes, pipes, etc.) or any other type of structure that can contain and guide gas flow through sensor 100, as would be apparent to one of ordinary skill in the art. In most embodiments, channels 112, 116, 118, and 136 should not have sharp bends, irregularities, or unnecessary obstructions that may introduce pneumatic noise, for example, by producing local turbulence or flow instability. In various embodiments, the overall lengths of measurement channel 116 and reference channel 118 can be equal or unequal.

Reference channel 118 terminates adjacent a reference probe 130. Likewise, measurement channel 116 terminates adjacent a measurement probe 128. Reference probe 130 is positioned above a reference surface 134. Measurement probe 128 is positioned above a measurement surface 132. In the context of lithography, measurement surface 132 can be a semiconductor wafer, a flat panel display substrate, or a stage supporting a substrate. Reference surface 134 can be a flat metal plate, but is not limited to this example.

Nozzles are provided in measurement probe 128 and reference probe 130. An example nozzle is described further below with respect to FIGS. 3 and 4. Gas injected by gas supply 102 is emitted from nozzles in probes 128 and 130, and impinges upon measurement surface 132 and reference surface 134.

As described above, the distance between a nozzle and a corresponding measurement or reference surface can be referred to as a standoff.

In one embodiment, reference probe 130 is positioned above a fixed reference surface 134 with a known reference standoff 142. Measurement probe 128 is positioned above measurement surface 132 with an unknown measurement standoff 140. The known reference standoff 142 is set to a desired constant value, which can be at an optimum standoff. With such an arrangement, the backpressure upstream of the measurement probe 128 is a function of the unknown measurement standoff 140; and the backpressure upstream of the reference probe 130 is a function of the known reference standoff 142.

If standoffs 140 and 142 are equal, the configuration is symmetrical and the bridge is balanced. Consequently, there is no gas flow through bridging channel 136. On the other hand, when the measurement standoff 140 and reference standoff 142 are different, the resulting pressure difference between the measurement channel 116 and the reference channel 118 induces a flow of gas through mass flow sensor 138.

Mass flow sensor 138 is located along bridge channel 136, which can be at a central point. Mass flow sensor 138 senses gas flow induced by pressure differences between measurement channel 116 and reference channel 118. These pressure differences occur as a result of changes in the vertical positioning of measurement surface 132.

In an example where there is a symmetric bridge, the measurement standoff 140 and reference standoff 142 are equal. Mass flow sensor 138 will detect no mass flow because there will be no pressure difference between the measurement and reference channels 116 and 118. On the other hand, any differences between measurement standoff 140 and reference standoff 142 values can lead to different pressures in measurement channel 116 and reference channel 118. Proper offsets can be introduced for an asymmetric arrangement.

Mass flow sensor 138 senses gas flow induced by a pressure difference or imbalance. A pressure difference causes a gas flow, the rate of which is a unique function of the measurement standoff 140. In other words, assuming a constant flow rate into gas gauge 100, the difference between gas pressures in the measurement channel 116 and the reference channel 118 is a function of the difference between the magnitudes of standoffs 140 and 142. If reference standoff 142 is set to a known standoff, the difference between gas pressures in the measurement channel 116 and the reference channel 118 is a function of the size of measurement standoff 140 (that is, the unknown standoff in the z direction between measurement surface 132 and measurement probe 128).

Mass flow sensor 138 detects gas flow in either direction through bridge channel 136. Because of the bridge configuration, gas flow occurs through bridge channel 136 only when pressure differences between channels 116 and 118 occur. When a pressure imbalance exists, mass flow sensor 138 detects a resulting gas flow, and can initiate an appropriate control function, which can be done using optional controller 150 that is coupled to appropriate parts of system 100. Mass flow sensor 138 can provide an indication of a sensed flow through a visual display or audio indication, which can be done through use of optional output device 152.

Alternatively, in place of a mass flow sensor, a differential pressure sensor (not shown) can be used. The differential pressure sensor measures the difference in pressure between the two channels, which is a function of the difference between the measurement and reference standoffs.

The control function in optional controller 150 can be to calculate the exact gap differences. In another embodiment, the control function may be to increase or decrease the size of measurement standoff 140. This is accomplished by moving the measurement surface 132 relative to measurement probe 128 until the pressure difference is sufficiently close to zero, which occurs when there is no longer a difference between the standoffs from measurement surface 132 and reference surface 134.

It is to be appreciated that mass flow rate controller 106, snubber 110, and restrictors 120 and 122 can be used to reduce gas turbulence and other pneumatic noise, which can be used to allow the present invention to achieve nanometer accuracy. These elements may all be used within an embodiment of the present invention or in any combination depending on the sensitivity desired. For example, if an application required very precise sensitivity, all elements may be used. Alternatively, if an application required less sensitivity, perhaps only snubber 110 would be needed with porous restrictors 120 and 122 replaced by orifices. As a result, the present invention provides a flexible approach to cost effectively meet a particular application's requirements.

In one embodiment of the present invention porous restrictors 120 and 122 are used. Porous restrictors 120 and 122 can be used instead of sapphire restrictors when pressure needs to be stepped down in many steps, and not quickly. This can be used to avoid turbulence.

Flow Restrictors

According to one embodiment of the present invention measurement channel 116 and reference channel 118 contain restrictors 120 and 122. Each restrictor 120 and 122 restricts the flow of gas traveling through their respective measurement channel 116 and reference channel 118. Measurement channel restrictor 120 is located within measurement channel 116 between junction 114 and junction 124. Likewise, reference channel restrictor 122 is located within reference channel 118 between junction 114 and junction 126. In one example, the distance from junction 114 to measurement channel restrictor 120 and the distance from junction 114 to reference channel restrictor 122 are equal. In other examples, the distances are not equal. There is no inherent requirement that the sensor be symmetrical, however, the sensor is easier to use if it is geometrically symmetrical.

Figure 2:
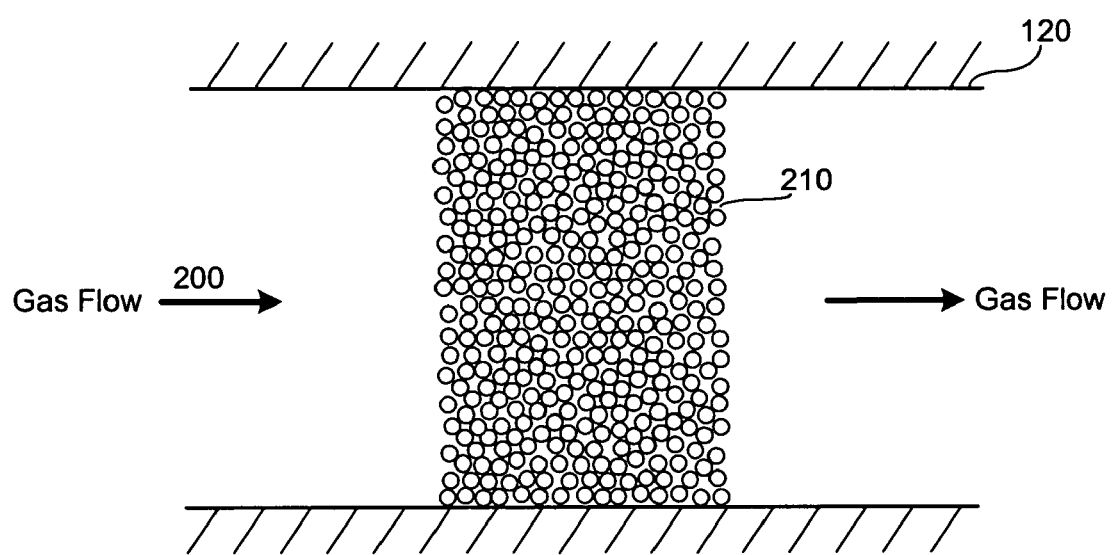
FIG. 2 is a diagram that provides a cross sectional view of a restrictor, according to one embodiment of the present invention.

FIG. 2 provides a cross-sectional image of restrictor 120 having porous material 210 through which a gas flow 200 passes, according to a further feature of the present invention. Each restrictor 120 and 122 can consist of a porous material (e.g., polyethylene, sintered stainless steel, etc.). Measurement channel restrictor 120 and reference channel restrictor 122 can have substantially the same dimensions and permeability characteristics. In one example, restrictors 120 and 122 can range in length from about 2 to about 15 mm, but are not limited to these lengths. Measurement channel restrictor 120 and reference channel restrictor 122 can evenly restrict gas flow across the cross-sectional areas of the channels 116 and 118. Porous material restrictors can provide a significant reduction in turbulence and associated pneumatic noise. This is in comparison to the amount of turbulence and noise introduced by restrictors that use a single orifice bored out of a solid, non-porous material.

The restrictors can serve at least two key functions. First, they can mitigate the pressure and flow disturbances present in gas gauge proximity sensor 100, most notably disturbances generated by mass flow controller 110 or sources of acoustic pick-up. Second, they can serve as the required resistive elements within the bridge.

Exemplary embodiments of a gas gauge proximity sensor have been presented. The present invention is not limited to this example. This example is presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the present invention.

Nozzle

Figure 3:
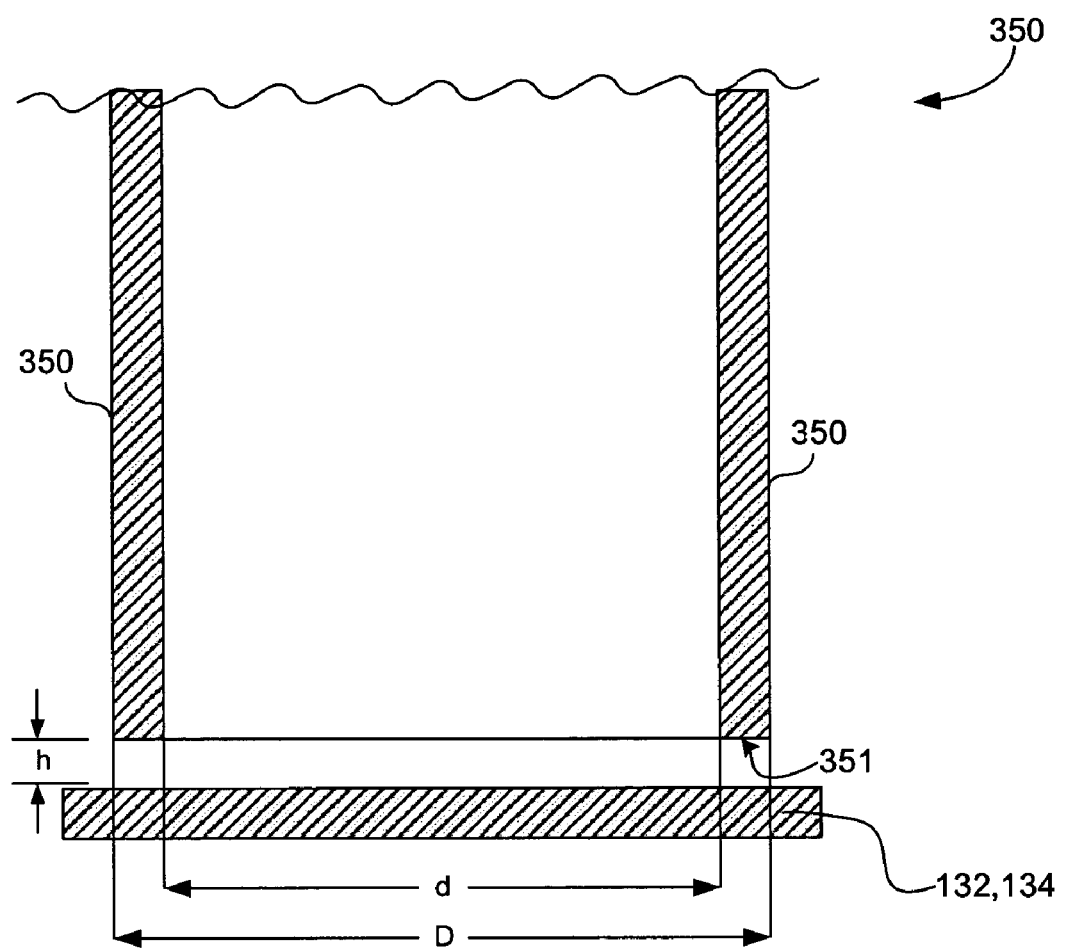
FIG. 3 shows a cross-sectional view of a nozzle and its characteristics, according to one embodiment of the present invention.

FIG. 3 shows a cross-sectional view of a nozzle 350, respectively, and characteristics thereof, according to embodiments of the present invention. The basic configuration of a gas gauge nozzle 350 is characterized by a flat end surface 351 that is parallel to measurement surface 132 or reference surface 134. The geometry of a nozzle is determined by the gauge standoff, h, and the inner diameter, d. Generally, the dependence of the nozzle pressure drop on the nozzle outer diameter D is weak, if D is sufficiently large. The remaining physical parameters are: $Q_m$—mass flow rate of the gas, and $\Delta p$—pressure drop across the nozzle. The gas is characterized by the density, $\rho$, and dynamic viscosity, $\eta$.

A relationship is sought between non-dimensional parameters:

$$\frac{\Delta p}{\frac{1}{2}\rho u^2},$$

the Reynolds Number, Re, and $$\frac{h}{d},$$

where the radial velocity, u, is taken at the entrance to the cylindrical region between the nozzle face and the substrate surface. The Reynolds number is defined as $$Re = \frac{ud}{v},$$

where v is the kinematic coefficient of viscosity.

Therefore, the behavior of the nozzle can be described in terms of five physical variables: v, $\Delta p$, $Q_m$, d, and h. There is a relationship between $\Delta p$ and h and the remaining variables would be typically constant for a practical system. This relationship facilitates the development of nozzle types for different applications, requiring different sensitivities.

Exemplary embodiments of a nozzle has been presented. The present invention is not limited to this example. The example is presented herein for purposes of illustration, and not limitation. Alternatives (including equivalents, extensions, variations, deviations, etc., of those described herein) will become apparent to persons skilled in the relevant art(s) based on the teachings contained herein. Such alternatives fall within the scope and spirit of the present invention.

Method of Using Sensor

Figure 4:
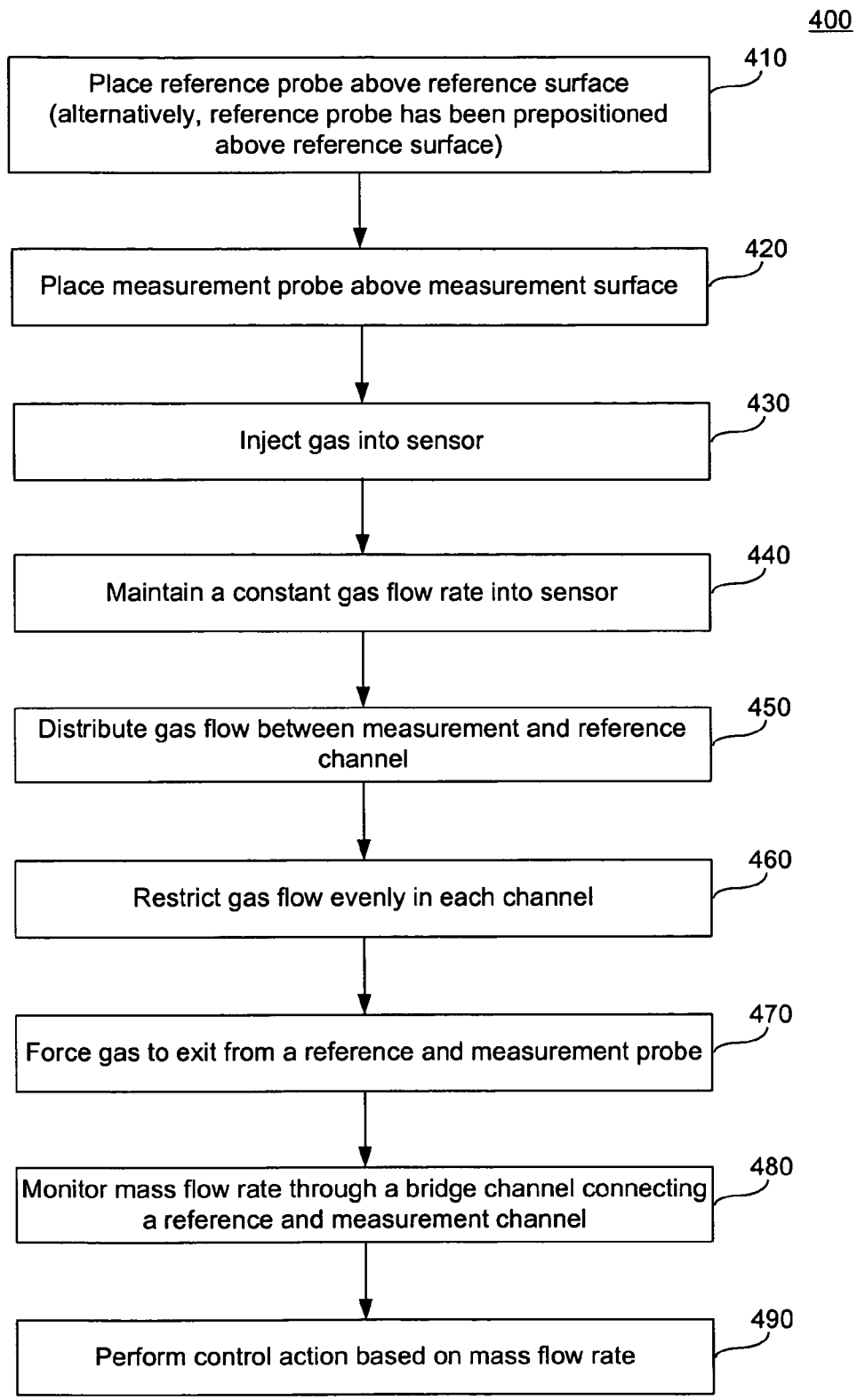
FIG. 4 is a flowchart diagram that shows a method for using a gas gauge proximity sensor to detect very small distances and perform a control action, according to one embodiment of the present invention.

FIG. 4 illustrates a flow-chart depicting a method 400 for using gas flow to detect very small distances and perform a control action (e.g., steps 410–470). For convenience, method 400 is described with respect to gas gauge proximity sensor 100. However, method 400 is not necessarily limited by the structure of sensor 100, and can be implemented with gas gauge proximity sensor with a different structure.

In step 410, a reference probe is positioned above a reference surface (e.g., by an operator, a mechanical device, a robotic arm, or the like). For example, a robot can position reference probe 130 above reference surface 134 with known reference standoff 142. Alternatively, the reference standoff can be arranged within the sensor assembly, that is, internal to the sensor assembly. The reference standoff is pre-adjusted to a particular value, which typically is maintained constant.

In step 420, a measurement probe is positioned above a measurement surface. For example, measurement probe 128 is positioned above measurement surface 132 to form measurement gap 140.

In step 430, gas is injected into a sensor. For example, a measurement gas is injected into gas gauge proximity sensor 100 with a constant mass flow rate. In step 440, a constant gas flow rate into a sensor is maintained. For example, mass flow controller 106 maintains a constant gas flow rate. In step 450, gas flow is distributed between measurement and reference channels. For example, gas gauge proximity sensor 100 causes the flow of the measurement gas to be evenly distributed between measurement channel 116 and reference channel 118.

In step 460, gas flow in the measurement channel and the reference channel is restricted evenly across cross-sectional areas of the channels. Measurement channel restrictor 120 and reference channel restrictor 122 restrict the flow of gas to reduce pneumatic noise and serve as a resistive element in gas gauge proximity sensor 100.

In step 470, gas is forced to exit from a reference and measurement probe. For example, gas gauge proximity sensor 100 forces gas to exit measurement probe 128 and reference probe 130. In step 480, a flow of gas is monitored through a bridge channel connecting a reference channel and a measurement channel. In step 490, a control action is performed based on a pressure difference between the reference and measurement channel. For example, mass flow sensor 138 monitors mass flow rate between measurement channel 116 and reference channel 118. Based on the mass flow rate, mass flow sensor 138 initiates a control action. Such control action can include providing an indication of the sensed mass flow, sending a message indicating a sensed mass flow, or initiating a servo control action to reposition the location of the measurement surface relative to the reference surface until no mass flow or a fixed reference value of mass flow is sensed. It is to be appreciated that these control actions are provided by way of example, and not limitation.

Additional steps or enhancements to the above steps known to persons skilled in the relevant art(s) form the teachings herein are also encompassed by the present invention.

Sensor Using Modulated Gas Flow

Figure 5:
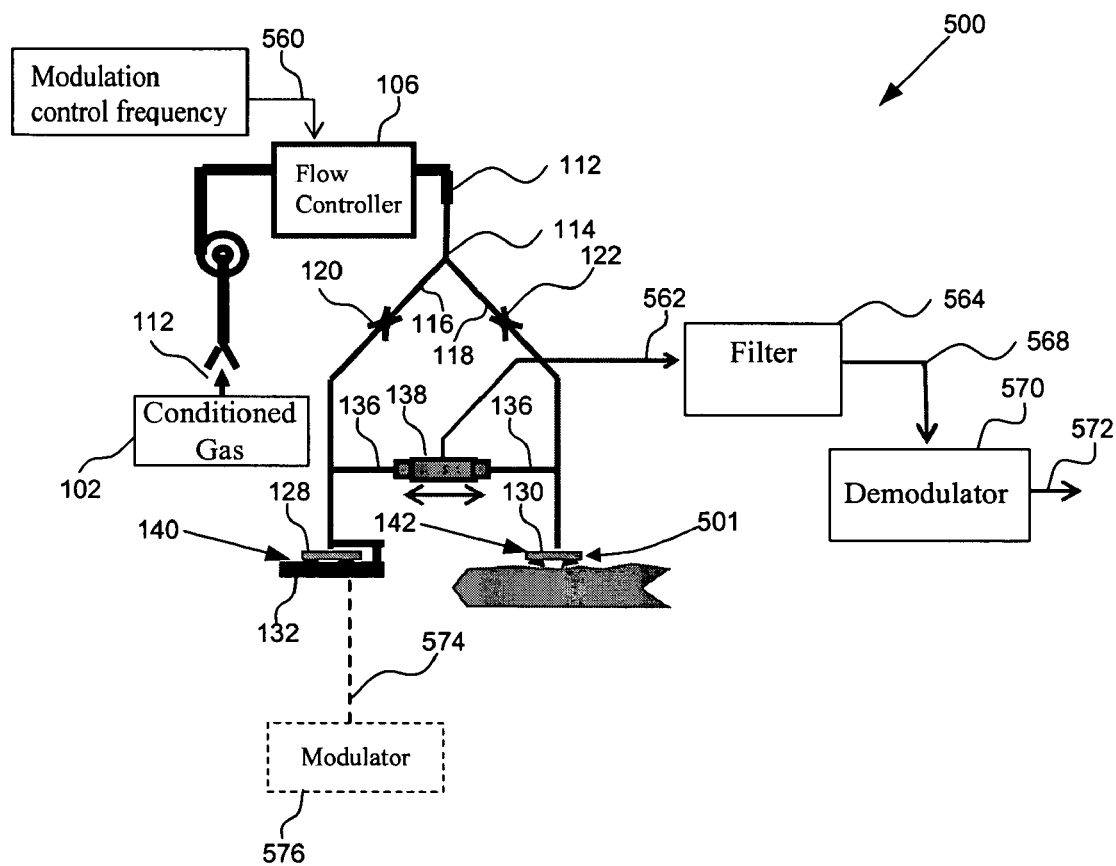
FIG. 5 shows a gas gauge proximity sensor according to one embodiment of the present invention.

The sensors described in the above embodiments may suffer from ambient noise caused by air flow proximate the reference surface and/or measurement surface. FIG. 5 shows a gas gauge proximity sensor according to the present invention that overcomes this drawbacks that may arise when using the above described sensors.

FIG. 5 shows a sensor 500 according to an embodiment of the present invention. Sensor 500 is configured to compensate for and/or eliminate effects of an ambient noise signal 501 on a measured signal. Noise signal 501 can be caused by local air flow fluctuations near each surface 132 and 134. Noise signal 501 will have a specific frequency range that can be isolated from an arbitrary frequency F of a modulation signal 560, which can be adjusted to be distinct from the noise frequency of signal 501.

In a first embodiment, mass flow controller 106 receives modulation signal 560 (e.g., a frequency signal F). Modulating the mass flow controller 106 modulates gas flow from gas source 102. This modulated gas flow travels through both a measuring portion (e.g., measuring channel 118, measuring probe 130, etc.) and a reference portion (e.g., reference channel 118, measuring probe 128, etc.). Sensor 138 receives a differential gas flow that can includes the modulation frequency (signal 560), the noise frequency (signal 501), if any, and the differential gas flows.

In a second embodiment, reference surface 132 either is directly modulated or receives a modulation signal 574 from a modulation device 576 modulating at F. In this embodiment, a combined gas flow (e.g., a combination of a gas flow near reference surface 132, a gas flow near measurement surface 134, and a gas flow from gas source 102) becomes a modulated gas flow based on the modulation of the gas flow near reference surface 132. Modulation device 576 can be any device that can depart modulation at a frequency F, such as a piezoelectric device, a coil device, or the like, as would be apparent to one of ordinary skill in the art upon reading this description and appended claims.

In these embodiments, a sensor 138 is coupled to a filter 564 and a demodulator 570 to produce a demodulated output signal 572. A first gas flow proximate probe 128 and a second gas flow proximate probe 130 are compared using sensor 138 to produce a difference signal 562. Difference signal 562 can include the modulation frequency F and the noise frequency (signal 501), if any. Thus, difference signal 562 can contain information including both wanted (e.g., a measurement signal at the modulation frequency F and sidebands) and unwanted (e.g., noise 501) portions. Filter 564 (e.g., a band limiting, band pass, high pass, or the like) filters the difference signal 564 to produce a filtered signal 568. Filtered signal 568 can contain information within a certain frequency range, so that low and/or high frequency noise and interference are filtered out leaving only a desired portion of difference signal 564. Demodulator 570 demodulates filtered signal 568 using a frequency F equal to the modulation frequency F to produce demodulated signal 572 (e.g., measurement signal, results signals, etc.). Demodulated signal 572 can contain information about a measurement standoff 142, which also gives information about work piece 138.

Figure 7:
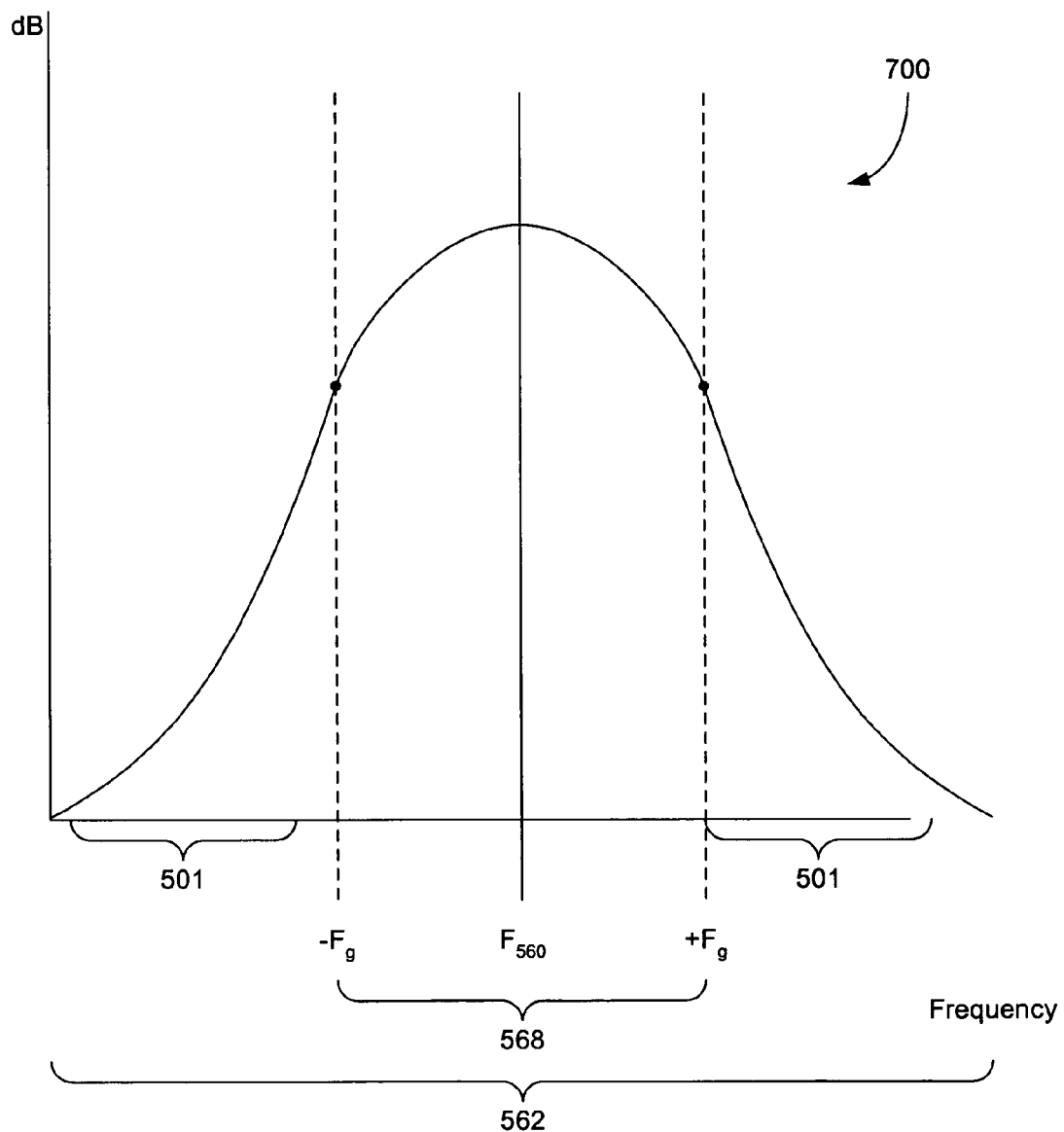
FIG. 7 shows a frequency versus decibel graph of measured signal according to one embodiment of the present invention.

FIG. 7 shows a frequency versus decibel graph 700 of measured signal 562 according to an embodiment of the present invention. A desired band range (e.g., F+/−Fg (a desired response of air gauge 500)) is centered at demodulation signal 560 frequency F, which in this embodiment corresponds to filtered signal 568. A desired band range is chosen so that a frequency of noise signal 501 is outside of the band range, regardless of whether the noise signal 501 frequency is above or below the band range.

For example, if noise 501 is at 10 Hz, then a modulation rate (F) of 100 Hz and a pass band of 80–120 Hz would allow only desired portions of differential signal 562 to be used for determining measuring standoff 142.

As another example, consider the need for gas gauge proximity sensor 500 with a 0 hz to 10 hz response, which has to operate in an environment with varying air pressure strengths and acoustical noise 501 producing ambient interference in the 0 hz to 30 hz region. Gas gauge proximity sensor device 500 can have a modulated gas flow at a modulation frequency F of 70 hz. Filter 564 allows only 60 hz to 80 hz information through, for example. This suppresses the ambient 0 hz to 30 hz interference 501. The filter output 568 is then demodulated at frequency F of 70 Hz to reconstruct the desired 0 to 10 hz response. In this embodiment, sensor 138 should be capable of 100 hz performance.

In these embodiments, ambient acoustical energy is weaker in the vicinity of the modulation frequency F than it is around zero to Fg (the desired response of air gauge proximity sensor 500). The combined gas flow stream is modulated with F. Any imbalance in bridge channel 136 produces a signal 562 at F, at amplitude that varies with the imbalance. As the imbalance occurs at frequencies higher than zero, it results in amplitude modulation of signal 562. This produces a band of frequencies around F of +/−Fg. Filter 564 can allow passage of these signals, but suppresses all other signals 568, including undesired acoustical interference 501. Filter output 568 is measured for amplitude (e.g., demodulated using demodulator 578) and the resultant output signal 572 is the desired bridge imbalance without the acoustical interference 501.

It is to be appreciated that filter 564 and demodulator 570 can be formed as one device that performs both functions or two or more separate devices. It is also to be appreciated filter 564 and demodulator 570 can be formed from analog and/or digital devices as hardware, software, or firmware. When done in a digital domain, quantizers, digital signal processors, and the like, can be used. In various embodiments, demodulator 570 can be similar to an AM radio wavelength demodulation device, can use synchronous detection, or the like. It is also to be appreciated that filter 564 and demodulator 570 can be local within sensor 500 or remote from sensor 500, and coupled either through a hardwire or wireless transmission system.

Figure 6:
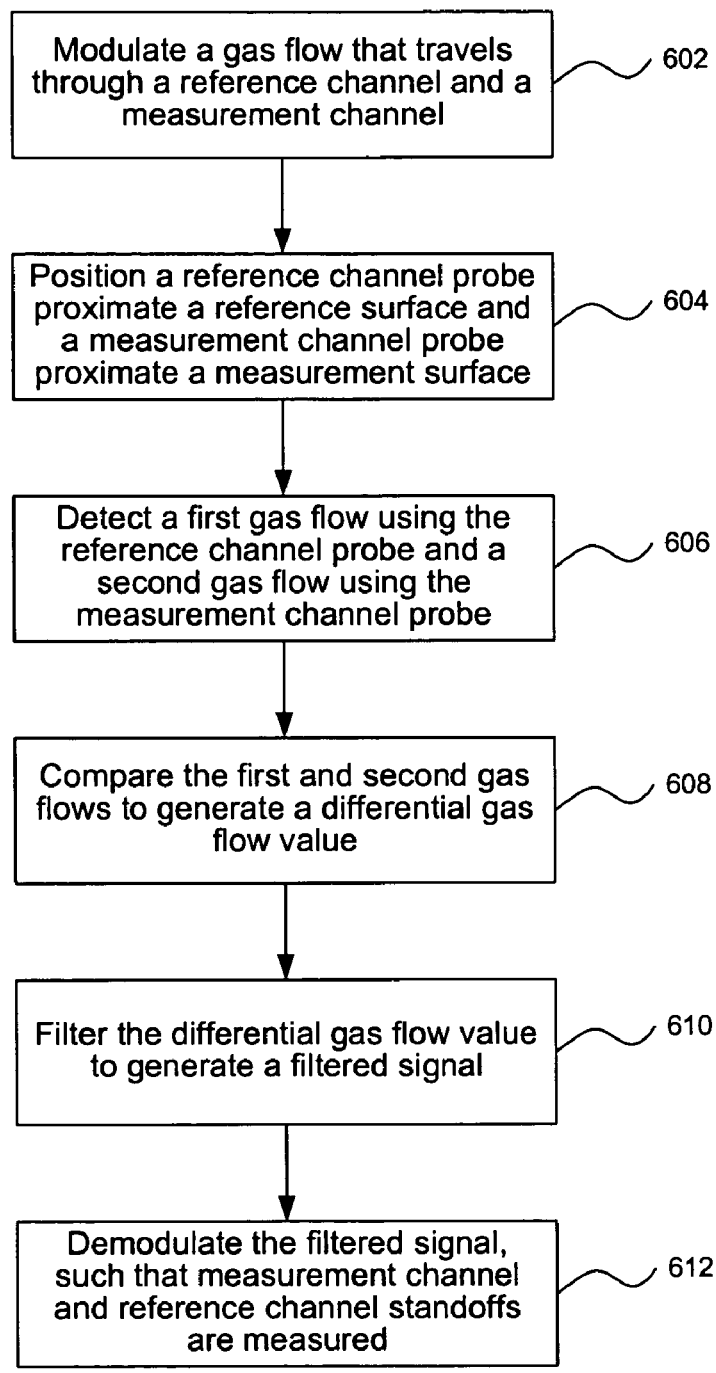
FIG. 6 shows a flowchart depicting a method according to one embodiment of the present invention.

FIG. 6 shows a flowchart depicting a method 600 according to an embodiment of the present invention. In step 602, a gas flow is modulated that travels through a reference channel and a measurement channel. In step 604, a reference channel probe is positioned proximate a reference surface and a measurement channel probe is positioned proximate a measurement surface. In step 606, a first gas flow is detected using the reference channel probe and a second gas flow is detected using the measurement channel probe. In step 608, the first and second gas flows are compared to generate a differential gas flow value. In step 610, the differential gas flow value is filtered to generate a filtered signal. In step 612, the filtered signal is demodulated, such that measurement channel and reference channel standoffs are measured.

The present invention has been described with respect to FIGS. 1–5 with reference to a gas or air. In one embodiment discussed above, the gas is air. The present invention is not limited to air. Other fluids, gases, or combinations thereof can be used. For example, depending on the surface being measured and/or a wavelength of light being used, a gas having a reduced moisture content, air, humidified air, dry air, noble gases, inert gases, halogen gases (fluorine, chlorine, etc.), nitrogen, hydrogen, oxygen, and argon may be used. A low moisture content gas is less likely than air to react with the surface being measured.

Sensor Using Ambient Air for Air Flow

As discussed above, the sensors described in the above embodiments directed to FIGS. 1–4 may suffer from ambient noise 801 caused by air flow proximate the reference surface 132 and/or measurement surface 138. Similar to sensors 500 and 600 discussed above, sensors 800 and 900 are configured to compensate for and/or eliminate effects of an ambient noise signal 801 on a measured signal. Noise signal 801 can be caused by local air flow fluctuations near each surface 132 and 134. Noise signal 801 will have a specific frequency range that can be isolated from an arbitrary frequency Fm of a modulation signal 859, which can be adjusted to be distinct from the noise frequency of signal 801

Figure 8:
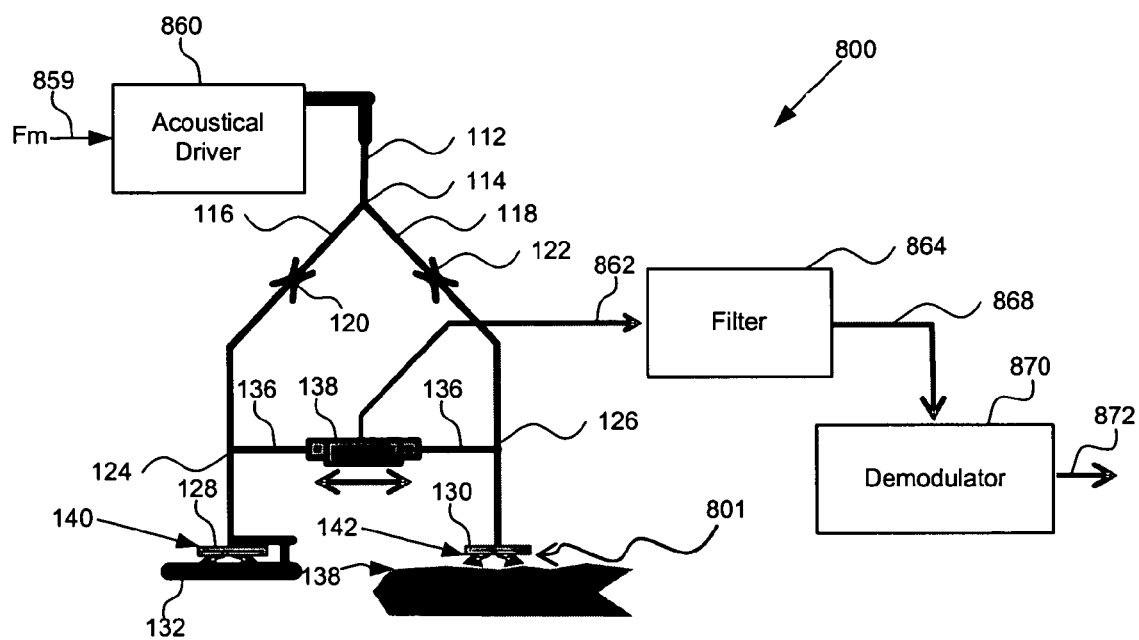
FIGS. 8 and 9 show gas gauge proximity sensors according to embodiments of the present invention.
Figure 9:
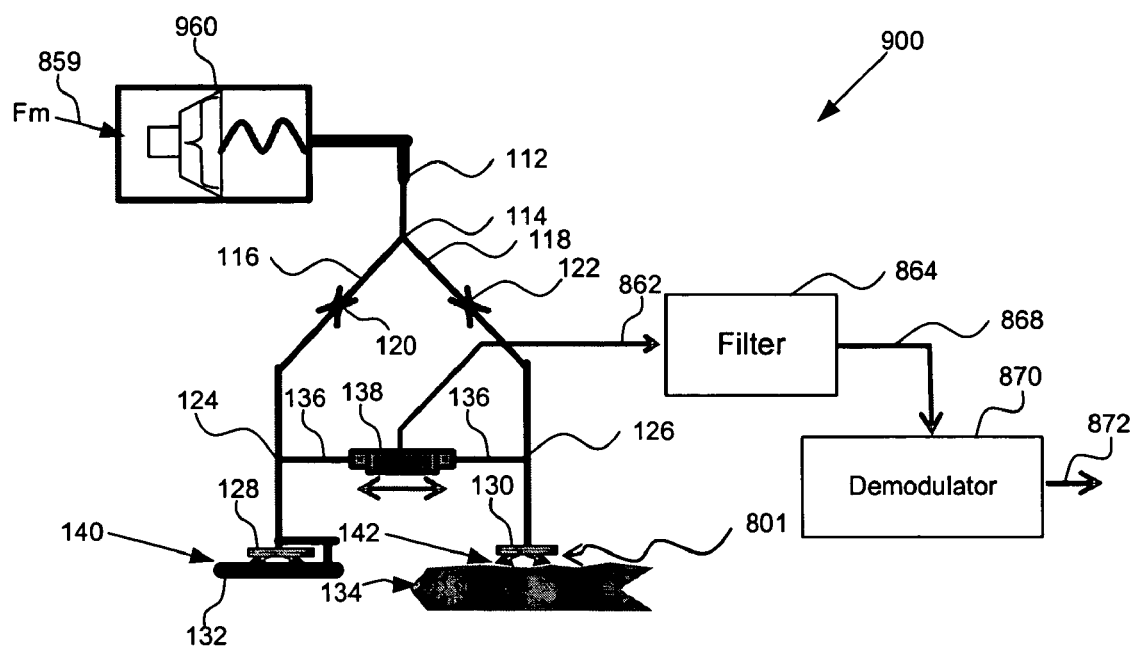

FIGS. 8 and 9 show air gauge proximity sensors according to embodiments of the present invention that overcome these drawbacks, and others discussed above, that may arise when using various wavelengths of light and/or various resist types.

FIGS. 8–9 show sensors 800 and 900 according to embodiments of the present invention. In these embodiments, instead of using a mass flow controller and conditioned air, a transducer 860 (e.g., an acoustical driver) generates an alternating gas flow that produces a modulated a sensor signal 862 that passes through a filter 864 and a demodulator 870 to remove unwanted portions (e.g., noise 801) of sensor signal 862.

Acoustical driver 860 (e.g., a speaker, headphone, piezoelectric crystal, microphone, or other device that converts input energy of one form into output energy of another, such as speaker 960 shown in FIG. 9) bi-directionally moves (e.g., pushes and pulls) ambient air near probes 128 and 130 through a measuring portion (e.g., measuring channel 116, measuring probe 128, etc, on a measuring side) and a reference portion (e.g., reference channel 118, reference probe 130, etc. on a reference side) of sensor 800. A period for pushing and pulling the ambient air can be set using a modulation frequency Fm 859 driving acoustical driver 860.

In this embodiment, a first gas flow proximate probe 128 and a second gas flow proximate probe 130 are compared using sensor 138 to produce a difference signal 862. Difference signal 862 can contain information including both wanted (e.g., a measurement signal at the modulation frequency and sidebands) and unwanted (e.g., noise 801) portions. Filter 864 (e.g., a band limiting, band pass, high pass, etc. filter) filters difference signal 864 to produce a filtered signal 868. Filtered signal 868 can contain information within a certain frequency range, so that low and/or high frequency noise and interference are filtered out leaving only a desired portion of difference signal 864. Demodulator 870 demodulates filtered signal 868 using a same frequency (e.g., Fm 859) as a modulation frequency Fm 859 (m stands for modulation) driving acoustical driver 860 produce a demodulated signal 872 (e.g., measurement signal, results signals, etc.). Demodulated signal 872 can contain information about a measurement standoff 142, which also gives information about work piece 138.

Acoustical driver 860 can be a audio speaker (960), a miniature audio ear-phone, or the like. The acoustic driver may a incorporate surface or diaphragm displaced by either electromagnetic, electrostatic, piezoelectric, or magnostrictive forces. Frequency Fm 859 applied to acoustical driver 860 can be low enough that the amplitude of cyclic flow are measured, as opposed to measuring the time an acoustic wave takes to reach a target. The net flow through the bridge can be zero.

It is to be appreciated that this embodiment, as well as the other embodiments described herein, can be used with immersion based s or maskless photolithography system, or the like.

The wavelength of driving frequency Fm 859 of acoustical driver 860 can be long with respect to length of bridge paths 136. Any imbalance in the bridge can produce an amplitude modulated signal 862 with a carrier frequency of Fm. This modulated signal 862 contains a band of frequencies around Fm of +/−fg (where fg is a desired response of gas gauge proximity sensor 800). Filter 864 allows passage of these signals 868, but suppresses all other signals, including the undesired acoustical interference 801. Filter output 868 is measured for amplitude (e.g., demodulated) and the resultant output 872 is the desired bridge imbalance.

For example, if noise 801 is at 10 Hz, then a modulation rate (frequency) of 100 Hz and a pass band of 80–120 Hz would allow only desired portions of differential signal 862 to be used for determining measuring standoff 142.

This embodiment also allows sensor 800 to be used in any lithography system using any wavelength without requiring any adaptations or modifications to sensor 800. In the embodiments discussed above using conditioned air and a mass flow controller, a different source of gas (e.g., humidified, dry, specific types of gas, etc.) had to be used depending on a wavelength of light used in the lithography tool and/or a type of resist used on a substrate. However, with this embodiment shown in FIGS. 8–9, because no conditioned source of gas is used, sensor 800 can be placed in any lithography system regardless of wavelength or resist type. Also, by using only ambient air, no contamination is introduced into the system that might have resulted in the above embodiments from the conditioned air source.

It is to be appreciated that filter 864 and demodulator 870 can be formed as one device that performs both functions or two or more separate devices. It is also to be appreciated filter 864 and demodulator 870 can be formed from analog and or digital devices as hardware, software, or firmware. When done in a digital domain, quantizers, digital signal processors, and the like, can be used. In various embodiments, demodulator 870 can be similar to any AM radio wavelength demodulation device, can use synchronous detection, or the like. It is also to be appreciated that filter 864 and demodulator 870 can be local within sensor 800 or remote from sensor 800 coupled either through a hardwire or wireless transmission system.

Figure 10:
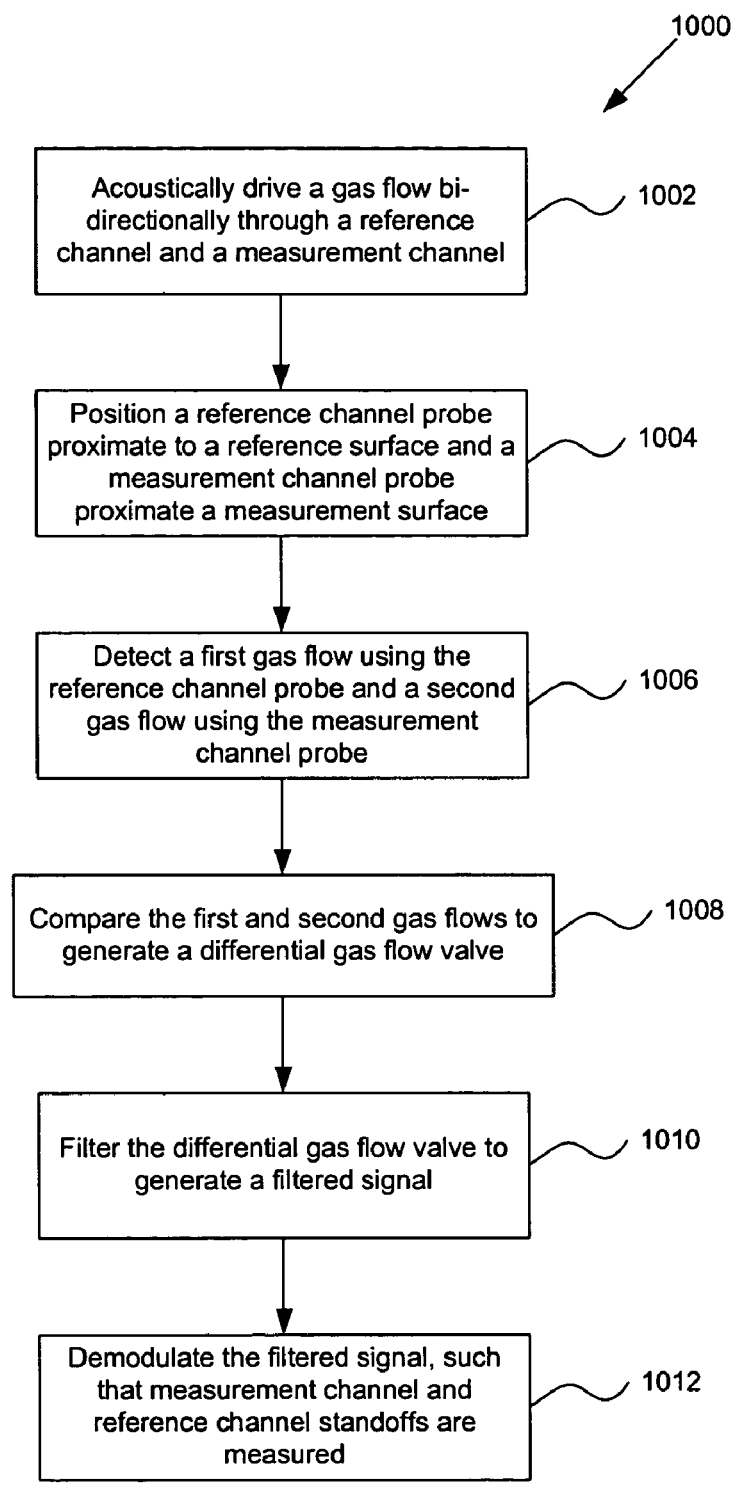
FIG. 10 shows a flowchart depicting a method according to one embodiment of the present invention The present invention will now be described with reference to the accompanying drawings. In the drawings, like reference numbers may indicate identical or functionally similar elements. Additionally, the left-most digit(s) of a reference number may identify the drawing in which the reference number first appears.

FIG. 10 shows a flowchart depicting a method 1000 according to an embodiment of the present invention. Method 1000 can be performed using system 800 or 900. In step 1002, a gas flow is acoustically driven bi-directionally through a reference channel and a measurement channel. In step 1004, a reference channel probe is positioned proximate to a reference surface and a measurement channel probe is positioned proximate a measurement surface. In step 1006, a first gas flow is detected using the reference channel probe and a second gas flow is detected using the measurement channel probe. In step 1008, the first and second gas flows are compared to generate a differential gas flow value. In step 1010, the differential gas flow value is filtered to generate a filtered signal. In step 1012, the filtered signal is demodulated, such that measurement channel and reference channel standoffs are measured.

The sensors described herein may be used within the systems disclosed in U.S. Ser. No. 10/322,768, filed Dec. 19, 2002, Ser. No. 10/646,720, filed Aug. 9, 2003, Ser. No. 10/833,249, filed Apr. 28, 2004, Ser. No. 10/812,098 filed Mar. 30, 2004, and Ser. No. 10/884,028, filed Jul. 20, 2004 and U.S. Pat. Nos. 4,953,388 and 4,550,592, which are all incorporated by reference herein in their entireties.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention. The present invention has been described above with the aid of method steps illustrating the performance of specified functions and relationships thereof. The boundaries of these method steps have been arbitrarily defined herein for the convenience of the description. Alternate boundaries can be defined. Any such alternate boundaries are thus within the scope and spirit of the claimed invention. Thus, the breadth and scope of the present invention should not be limited by any of the above-described exemplary embodiments, but should be defined only in accordance with the following claims and their equivalents.

What is claimed is:

1. A gas gauge proximity sensor, comprising:
   a measuring portion that detects a first gas flow proximate a measured surface;
   a reference portion that detects a second gas flow proximate a reference surface;
   a modulator that produces a modulated third gas flow, which is at least partially based on gas received from a gas source, flowing through the measuring portion and the reference portion;
   a detector that generates a differential signal corresponding to a difference between the first and second gas flows;
   a filter that filters the differential signal to produce a filtered signal; and
   a demodulator that demodulates the filtered signal to produce a measurement value.

2. The gas gauge proximity sensor of claim 1, wherein the detector comprises a mass flow sensor.

3. The gas gauge proximity sensor of claim 1, wherein the modulator comprises a modulated dynamic flow controller that modulates the gas received from the gas source.

4. The gas gauge proximity sensor of claim 3, wherein the dynamic flow controller comprises a mass flow controller.

5. The gas gauge proximity sensor of claim 1, wherein the modulator comprises a modulating device coupled to the reference surface that modulates the third gas flow by modulating the second gas flow.

6. The gas gauge proximity sensor of claim 5, wherein the modulating device comprises a piezoelectric device or a coil.

7. The gas gauge proximity sensor of claim 1, wherein a frequency of modulation of the modulator is used as a frequency of demodulation for the demodulator.

8. The gas gauge proximity sensor of claim 1, wherein the filter comprises a band pass filter.

9. The gas gauge proximity sensor of claim 1, wherein the filter comprises a band limited filter.

10. The gas gauge proximity sensor of claim 1, wherein the filter comprises a high pass filter.

11. The gas gauge proximity sensor of claim 1, wherein the filter and the demodulator are one or more analog devices.

12. The gas gauge proximity sensor of claim 1, wherein the filter and the demodulator are one or more digital devices.

13. The gas gauge proximity sensor of claim 1, wherein the filter comprises a filter that rejects portions of the measurement signal corresponding to a frequency of ambient noise in the first and second gas flows.

14. The gas gauge proximity sensor of claim 1, further comprising:
   a measurement standoff between the measurement surface and the measurement portion, wherein the first gas flow impinges on the measurement surface after traveling across the measurement standoff; and
   a reference standoff between the reference surface and the reference portion, wherein the second gas flow impinges on the reference surface after traveling across the reference standoff,
   wherein the differential signal corresponds to a difference between the reference standoff and the measurement standoff.

15. The gas gauge proximity sensor of claim 1, wherein the filter and the demodulator are formed as one digital device.

16. The gas gauge proximity sensor of claim 1, wherein the gas comprises air, humidified air, dry air, noble gases, halogen gases, nitrogen, hydrogen, oxygen, or argon.

17. A method, comprising:
   (a) modulating a gas flow that travels through a reference channel and a measurement channel;

(b) positioning a reference channel probe proximate a reference surface and a measurement channel probe proximate a measurement surface;

(c) detecting a first gas flow using the reference channel probe and a second gas flow using the measurement channel probe;

(d) comparing the first and second gas flows to generate a differential gas flow value;

(e) filtering the differential gas flow value to generate a filtered signal; and (f) demodulating the filtered signal, whereby measurement channel and reference channel standoffs are measured.

18. The method of claim 17, wherein step (a) comprises using a modulated dynamic flow controller to modulate gas received from a gas source, such that a frequency of modulation of the modulated dynamic flow controller is a same frequency used to perform step (f).

19. The method of claim 17, wherein step (a) comprises using a modulation device coupled to the reference surface to modulate the gas flow via modulating the first gas flow, such that a frequency of modulation of the modulated dynamic flow controller is a same frequency used to perform step (f).

20. The method of claim 17, wherein step (e) comprises using a band pass filter.

21. The method of claim 17, wherein step (e) comprises using a band limiting filter.

22. The method of claim 17, wherein step (e) comprises using a high pass filter.

23. The method of claim 17, wherein steps (e) and (f) are performed using a same digital device.

24. The method of claim 17, wherein steps (e) and (f) are performed using separate digital devices.

25. The method of claim 17, wherein steps (e) and (f) are performed using separate analog devices.

26. The method of claim 17, wherein step (a) comprises using a modulated mass flow controller to modulate gas received from a gas source, such that a frequency of modulation of the modulated dynamic flow controller is a same frequency used to perform step (f).

27. The method of claim 17, wherein step (e) comprises rejecting portions of the differential gas flow value corresponding to a frequency of ambient noise in at least one of the first and second gas flows.

28. The method of claim 17, further comprising using air, humidified air, dry air, noble gases, halogen gases, nitrogen, hydrogen, oxygen, or argon as the gas.

29. A gas gauge proximity sensor, comprising:
a measuring portion that detects a first gas flow proximate a measured surface;
a reference portion that detects a second gas flow proximate a reference surface;
an acoustical driver that generates a third, bi-directional gas flow through the measuring portion and the reference portion using gas adjacent at least one of a measured surface and a reference surface;
a detector that generates a differential signal corresponding to a difference between the first and second gas flows;
a filter that filters the differential signal to produce a filtered signal; and
a demodulator that demodulates the filtered signal to produce a measured value, whereby the measured value corresponds to a position of the measured surface.

30. The gas gauge proximity sensor of claim 29, wherein the detector comprises a mass flow sensor.

31. The gas gauge proximity sensor of claim 29, wherein the acoustical driver comprises a transducer.

32. The gas gauge proximity sensor of claim 29, wherein a frequency of modulation of the acoustical driver is used as a frequency of demodulation for the demodulator.

33. The gas gauge proximity sensor of claim 29, wherein the filter comprises a band pass filter.

34. The gas gauge proximity sensor of claim 29, wherein the filter comprises a band limited filter.

35. The gas gauge proximity sensor of claim 29, wherein the filter comprises a high pass filter.

36. The gas gauge proximity sensor of claim 29, wherein the filter and the demodulator are one or more analog devices.

37. The gas gauge proximity sensor of claim 29, wherein the filter and the demodulator are one or more digital devices.

38. The gas gauge proximity sensor of claim 29, wherein the filter comprises a filter that rejects portions of the measured value corresponding to a frequency of ambient noise in the first and second gas flows.

39. The gas gauge proximity sensor of claim 29, further comprising:
a measurement standoff between the measurement surface and the measurement portion, wherein the first gas flow communicates with the measurement surface after traveling across the measurement standoff; and
a reference standoff between the reference surface and the reference portion, wherein the second gas flow communicates with the reference surface after traveling across the reference standoff,
wherein the detector detects a difference between the reference standoff and the measurement standoff.

40. The gas gauge proximity sensor of claim 29, wherein an amount of pushed gas equals an amount of pulled gas in the third gas flow.

41. The gas gauge proximity sensor of claim 29, wherein the filter and the demodulator are formed as one digital device.

42. A method, comprising:
(a) acoustically driving a gas flow bi-directionally through a reference channel and a measurement channel;
(b) positioning a reference channel probe proximate to a reference surface and a measurement channel probe proximate a measurement surface;
(c) detecting a first gas flow using the reference channel probe and a second gas flow using the measurement channel probe;
(d) comparing the first and second gas flows to generate a differential gas flow value;
(e) filtering the differential gas flow value to generate a filtered signal; and
(f) demodulating the filtered signal, whereby measurement channel and reference channel standoffs are detected.

43. The method of claim 42, wherein step (a) comprises using a transducer to perform the acoustical driving.

44. The method of claim 42, wherein step (e) comprises using a band pass filter.

45. The method of claim 42, wherein step (e) comprises using a band limiting filter.

46. The method of claim 42, wherein step (e) comprises using a high pass filter.

47. The method of claim 42, wherein steps (e) and (f) are performed using a same digital device.

* * * * *